United States Patent
Kubo et al.

(10) Patent No.: US 7,632,600 B2
(45) Date of Patent: Dec. 15, 2009

(54) ENZYME ELECTRODE AND METHOD OF PRODUCING THE SAME

(75) Inventors: Wataru Kubo, Tokyo (JP); Tsuyoshi Nomoto, Tokyo (JP); Tetsuya Yano, Tokyo (JP); Rie Ueno, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 514 days.

(21) Appl. No.: 11/525,848

(22) Filed: Sep. 25, 2006

(65) Prior Publication Data

US 2007/0077483 A1 Apr. 5, 2007

(30) Foreign Application Priority Data

Sep. 30, 2005 (JP) ............... 2005-289102

(51) Int. Cl.
*H01M 4/00* (2006.01)
*H01M 4/88* (2006.01)
*C12N 11/00* (2006.01)

(52) U.S. Cl. .............. 429/43; 502/101; 204/403.01
(58) Field of Classification Search .......... 429/43; 501/101
See application file for complete search history.

(56) References Cited

U.S. PATENT DOCUMENTS 5,334,296 A * 8/1994 Henkens et al. .......... 205/777.5
6,019,998 A 2/2000 Nomoto et al. .......... 424/450
6,887,507 B2 5/2005 Nomoto et al. .......... 426/450

FOREIGN PATENT DOCUMENTS

SU 857845 * 8/1981

OTHER PUBLICATIONS

Adam Heller, "Electrical Connection of Enzyme Redox Centers to Electrodes", The Journal of Physical Chemistry, vol. 96, No. 9, 1992, pp. 3579-3587.
Alexey A. Vertegel, et al., "Silica Nanoparticle Size Influences the Structure and Enzymatic Activity of Adsorbed Lysozyme", Langmuir, vol. 20, No. 16, 2004, pp. 6800-6807.
Kei Yasui, et al., "Enzymatic Synthesis of Gold Nanoparticles Wrapped by Glucose Oxidase", Chemistry Letters, vol. 34, No. 3, 2005, pp. 416-417. (Supporting Information pp. 1-6).
Maya Zayats, et al., "Biocatalytic Growth of Au Nanoparticles: From Mechanistic Aspects to Biosensors Design", Nano Letters, vol. 5, No. 1, 2005, pp. 21-25. (Supporting Information pp. 1-4).

* cited by examiner

*Primary Examiner*—Patrick Ryan
*Assistant Examiner*—Thomas H. Parsons
(74) *Attorney, Agent, or Firm*—Fitzpatrick, Cella, Harper & Scinto

(57) ABSTRACT

An enzyme electrode that enables to enhance the rate of charge transfer from a redox center of an enzyme and catalytic current is provided. An enzyme electrode capable of increasing catalytic current by increasing the rate of charge transfer from an enzyme using an enzyme/metal fine particle complex in which part of a metal fine particle is incorporated into the enzyme can be provided.

12 Claims, 5 Drawing Sheets

ENZYME ELECTRODE AND METHOD OF PRODUCING THE SAME

BACKGROUND OF THE INVENTION

1. Field of the Invention

The present invention relates to an enzyme electrode, more specifically to an enzyme electrode using an enzyme/metal particle complex produced by an enzyme reaction, a method of producing the same and use thereof.

2. Description of the Related Art

Enzymes, which are proteins made in living cells and act as biocatalysts, work potently under milder conditions compared to general catalysts. Enzymes have high substrate specificity and generally catalyze only a certain reaction of a certain substrate. Of such enzymes, an enzyme called oxidoreductase catalyzes the redox reaction of a substrate.

If the charge produced in the oxidoreductase by enzyme reaction can be transported to a conductive member, an electrode with low overpotential and high selectivity can be produced utilizing functions of enzymes.

However, the redox center of an oxidoreductase is often positioned deep inside a three-dimensional structure of protein. For this reason, the distance between a redox center and a conductive member is far to effectively transfer electrons to the conductive member, and therefore, direct electron transfer between the active site of an oxidoreductase and a conductive member is generally difficult.

An approach of electrically connecting an enzyme and a conductive member with a substance called a mediator has been widely used (e.g., Adam Heller, J. Phys. Chem. 1992, 96, 3579-3587).

Mediator molecules can diffuse into protein of an enzyme and transfer electrons between it and the redox center of the enzyme only when they come sufficiently close to the redox center of the enzyme. Then, the mediator which has transferred electrons from the active site, i.e., the redox center, of the enzyme, transports the charge to a conductive member by diffusion or electron hopping, whereby the charge in the enzyme reaction is transported to the conductive member.

With recent development in nanotechnology, many methods of preparing metal particles have been reported. Kei Yasui and Nobuo Kimizuka, Chem. Lett. 2005, 34, 416-417 describes an approach of producing gold particles by catalysis of an enzyme, i.e., glucose oxidase. In the document, measurement of infrared spectra and zeta potential indicates that the enzyme is immobilized on the produced gold particles. Further, measurement of circular dichroism spectra suggests denaturation of the enzyme. In addition to this, Maya Zayats, Ronan Barton, Inna Popov and Itamar Willner, Nano Lett. 2004, 5, 21-25 describes an optical glucose sensor utilizing growth of gold particles due to hydrogen peroxide produced by the enzyme reaction of glucose oxidase and increase in plasmon absorption based on the growth.

On the other hand, Alexey A. Vertegel, Richard W. Siegel and Jonathan S. Dordick, Langmuir 2004, 20, 6800-6807 disclose a complex of an enzyme and metal and show that when adsorbed to particles such as gold and silica, activity of functional protein including enzymes is generally significantly reduced.

SUMMARY OF THE INVENTION

Adam Heller, J. Phys. Chem. 1992, 96, 3579-3587 described above discloses an enzyme electrode using a mediator. Since mediator molecules are generally small, they can easily penetrate into an area near the redox center of protein of an enzyme. The charge produced in the redox center of the enzyme by the enzyme reaction is transferred to mediator molecules having appropriate redox potential, and due to diffusion of the mediator molecules or electron hopping between the mediator molecules, electrons are then transported to an area near a conductive member. Lastly, due to transfer of electrons between the conductive member and the mediator, the charge is drawn to the conductive member. Here, diffusion of a mediator to an area near the redox center of an enzyme is slow because spaces in protein of the enzyme are small. In other words, the diffusion of the mediator in enzymes is one of the major rate-determining processes of the charge transfer from the redox center of the enzyme to outside of the enzyme via the mediator.

Accordingly, to further increase the rate of charge transfer and increase current values, enzyme electrodes using such a mediator alone seem to have limitation. Specifically, to achieve higher performance, sensors using an enzyme electrode in which such a mediator is used have limited sensitivity and biofuel cells using such an enzyme electrode have limited output.

An objective of the present invention is to provide an enzyme electrode in which the rate of charge transfer from a redox center of an enzyme is increased and a method of producing the same. Another objective of the present invention is to provide a sensor and a biofuel cell using the enzyme electrode. Still another objective of the present invention is to provide a method of detection and determination of an analyte using the enzyme electrode. Yet another objective of the present invention is to provide a method of producing an enzyme/metal particle complex useful as a material constituting the enzyme electrode.

According to an aspect of the present invention, there is provided an enzyme electrode comprising a conductive member, an enzyme and a metal particle, wherein the metal particle is located in the enzyme.

The metal particle and the enzyme preferably comprise a complex in which part of the metal particle is incorporated into the enzyme. The enzyme electrode preferably further comprising a mediator which mediates charge transfer between the complex and the conductive member. The enzyme electrode preferably further comprising a carrier that immobilizes at least one of the complex and the mediator on the conductive member.

The metal particles are preferably formed by allowing the enzyme and a substance that is a substrate for the enzyme to react in the presence of a metal precursor capable of forming a metal by the reaction of the enzyme and the substrate.

The conductive member can have a porous structure and the complex of the enzyme and the metal particle is formed in a pore of the porous structure.

The metal comprising the metal particles is preferably gold.

In the enzyme electrode, an aggregated particle or the metal particles preferably has a particle diameter of 200 nm or less.

According to another aspect of the present invention, there is provided a fuel cell comprising a space capable of holding an electrolyte between an anode electrode and a cathode electrode, wherein at least one of the anode electrode and the cathode electrode is the above enzyme electrode.

According to still another aspect of the present invention, there is provided a method of producing a metal particle in a pore of a porous material, which comprises: introducing an enzyme into a pore of the porous material, and forming metal particles from a precursor of the metal particles by the reaction of the enzyme and a substrate for the enzyme in the presence of the substrate and the precursor.

According to a further aspect of the present invention, there is provided a method of producing an enzyme electrode, which comprises the steps of: providing an enzyme, and reacting enzyme with a substrate for the enzyme in the presence of a metal precursor capable of forming a metal by the reaction of the enzyme and the substrate to prepare an enzyme/metal particle complex containing a metal particle in the enzyme.

According to a further aspect of the present invention, there is provided a method of producing an enzyme electrode, which comprises the steps of preparing an enzyme, and reacting the enzyme with a substrate for the enzyme in the presence of a metal precursor capable of forming a metal by the reaction of the enzyme and the substrate to prepare an enzyme/metal particle complex containing a metal particle in the enzyme.

According to a further aspect of the present invention, there is provided a method of producing an enzyme electrode, which comprises the steps of introducing an enzyme into a pore of a porous material, and allowing the enzyme in the pore of the porous material to react with a substrate for the enzyme in the presence of a metal precursor capable of forming a metal by the reaction of the enzyme and the substrate to prepare an enzyme/metal particle complex containing a metal particle in the enzyme.

The method of detecting an analyte of the present invention comprises measuring the presence or the amount of an analyte in a sample solution by detecting the presence of current which indicates the reaction of the analyte and an enzyme upon bringing an enzyme electrode in which the analyte acts as a substrate into contact with the sample solution by an outer circuit connected to the enzyme electrode, wherein the enzyme electrode of the above structure is used as the enzyme electrode.

The method of supplying electrical energy of the present invention comprises supplying electrical energy produced upon bringing a solution containing a substrate of an enzyme included in an enzyme electrode into contact with the enzyme electrode to an outer circuit connected to the enzyme electrode, wherein the enzyme electrode of the above structure is used as the enzyme electrode.

The sensor of the present invention comprises an enzyme electrode as a detection unit, wherein the enzyme electrode of the above structure is used as the enzyme electrode.

The present invention can produce an enzyme/metal particle complex in which at least part of a metal particle is incorporated into the enzyme.

Use of the complex in an enzyme electrode can enhance the rate of electron transfer from an enzyme and increases catalytic current.

When the enzyme/metal particle complex is immobilized in a pore of a porous material, an enzyme electrode with improved environmental stability can be provided.

Further features of the present invention will become apparent from the following description of exemplary embodiments (with reference to the attached drawings).

DESCRIPTION OF THE EMBODIMENTS

In the present invention, an enzyme/metal particle complex in which part of a metal particle is incorporated into an enzyme is used as an enzyme included in the enzyme electrode as a means for solving the problem.

It is generally known that activity of functional protein including enzymes is significantly reduced when adsorbed to particles such as gold and silica (Alexey A. Vertegel, Richard W. Siegel and Jonathan S. Dordick, Langmuir 2004, 20, 6800-6807). In Kei Yasui and Nobuo Kimizuka, Chem. Lett. 2005, 34, 416-417 as well, measurement of circular dichroism spectra suggests denaturation of an enzyme adsorbed to gold particles, for which no stabilizer is used. These backgrounds show that a complex obtained by interaction of metal particles and an enzyme without using a modifier is generally not used for devices detecting analyte or generating electricity. Exceptionally, however, biodevices utilizing specific characteristics of metal particles, typically plasmon absorption, are manufactured in some cases. In view of these conventional ideas, the present inventors have found that by adopting a method of producing metal particles from a precursor thereof by an enzyme reaction around a space near the active center of the enzyme, metal can be consequently produced within a distance that enables to transfer of electrons from the redox center of the enzyme. The present inventors have also found that the metal can serve as a lead that transfers charge from a redox center of an enzyme. Accordingly, an enzyme/metal particle complex has been prepared by an enzyme reaction, an enzyme electrode has been prepared using the complex, and characteristics thereof have been compared with those of an enzyme electrode prepared using an enzyme which is not combined with metal particles. As a result, it has been found that the enzyme electrode using the enzyme/metal particle complex exhibits superior properties compared to the enzyme electrode prepared using an enzyme that is not combined with metal particles, and the present invention has been completed.

Preferred embodiments of the present invention are now described in detail.

Figure 1A:
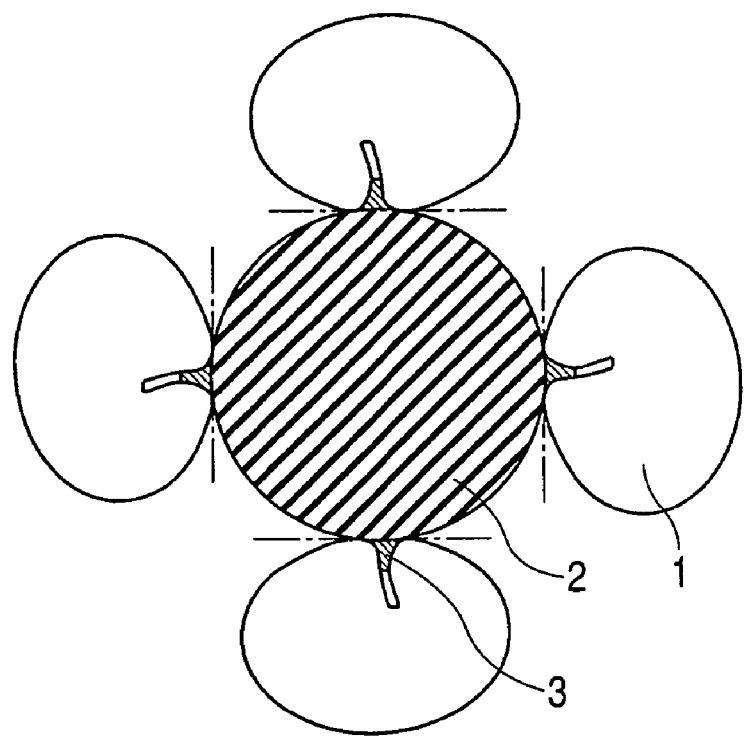
FIGS. 1A and 1B illustrate an enzyme/metal particle complex in which a metal particle is incorporated into an enzyme.
Figure 1B:
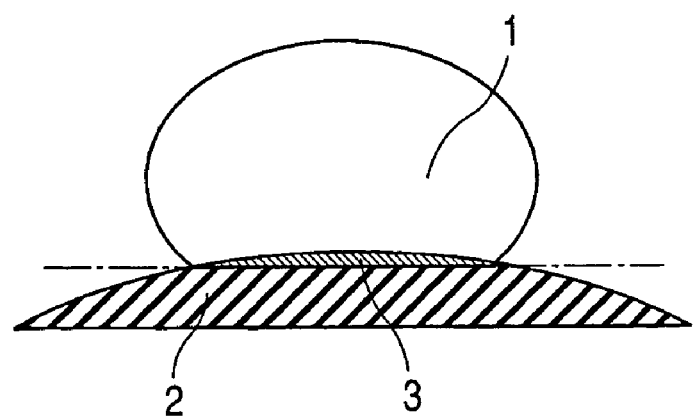

The enzyme electrode of the present invention is comprise of a conductive member, an enzyme and metal particles, wherein the metal particles and the enzyme form an enzyme/metal particle complex in which part of a metal particle is incorporated into the enzyme. Herein, the enzyme/metal particle complex in which a metal particle is incorporated into the enzyme has a structure as shown in FIGS. 1A and 1B. Specifically, when a cross-section of the complex is observed, a metal particle is present beyond a line (chain line in the figures) joining points where three substances of an enzyme 1, a metal particle 2 and a solution surrounding them intersect. Such complexes include a complex in which a portion 3 of a metal particle is incorporated into a microspace of an enzyme 1 as shown in FIG. 1A and a complex in which a portion 3 of a particle 2 is incorporated into the outer edge of an enzyme 1 over a long area as shown in FIG. 1B.

The position of an enzyme and a gold particle as shown in FIGS. 1A and 1B can be confirmed by, for example, observing an enzyme/gold particle complex by a transmission electron microscope.

The structure in which part of a metal particle is incorporated into an enzyme can be obtained by an enzyme reaction in the presence of a metal precursor capable of forming a metal by interaction (enzyme reaction) between the enzyme and a substrate for the enzyme. By the enzyme reaction in the presence of a metal precursor, the substrate reacts within the enzyme including the active site (active center) of the enzyme, upon which metal is formed from the metal precursor. With the progress of these reactions, the metal grows from the inside of the enzyme. In some cases, metal formed outside the enzyme and metal inside the enzyme are combined to form metal particles. In the metal particles thus obtained, part thereof is incorporated into the enzyme.

Herein, a substance whose chemical change by the action of an enzyme can produce a metal from a metal precursor is used as a substrate for an enzyme. Preferred combinations of an enzyme and a substrate include combinations of an enzyme and a substrate capable of producing charge in the redox center of oxidoreductase by the reaction of the enzyme on the substrate. Examples of such a substrate for an enzyme include normal substrates for an enzyme (e.g., glucose for glucose oxidase, ethanol for alcohol dehydrogenase), and in addition, natural or artificial compounds as a substrate on which an enzyme can act.

For forming metal particles from a metal precursor, an approach in which a solution containing an enzyme, a substrate for the enzyme and a metal precursor is prepared, and simultaneously with producing metal particles from the metal precursor with the progress of an enzyme reaction, the metal particles and the enzyme are formed into a complex is preferably used. The metal particles in this case include not only metal particles produced directly by the reaction of an enzyme on a substrate but also metal particles secondarily produced by the action of a product on a metal precursor, which product is produced by the action of an enzyme on a substrate.

Specific examples of such a solution include a solution obtained by adding glucose oxidase, glucose and chloroaurate salts. In this solution, Au ion is reduced by $FADH_2$ which is the redox center of glucose oxidase produced by the oxidation reaction of glucose in glucose oxidase. In addition to this, Au ion is reduced by hydrogen peroxide produced by the reaction between glucose and oxygen in glucose oxidase. The above reaction may include these steps. This does not preclude the possibility that the enzyme electrode of the present invention comprises an enzyme that is not combined with a metal particle or a metal particle that is not combined with an enzyme in addition to an enzyme/metal particle complex.

Oxidoreductases can be preferably used as an enzyme used for an enzyme/metal particle complex. These enzymes catalyze a redox reaction of a substrate.

An enzyme or a plurality of different enzymes may be immobilized on the enzyme electrode in order to obtain intended properties. Also, an enzyme or a plurality of different enzymes may be combined with a metal particle.

Examples of enzymes which can be used in the present invention include glucose oxidase, bilirubin oxidase, laccase, pyruvate oxidase, cholesterol oxidase, lactate oxidase, ascorbate oxidase, cytochrome oxidase, alcohol dehydrogenase, cholesterol dehydrogenase, aldehyde dehydrogenase, formate dehydrogenase, glucose dehydrogenase, lactate dehydrogenase, diaphorase, catalase, peroxidase and thioredoxin reductase. Also, an enzyme other than oxidoreductase can be used together with oxidoreductase. In that case, a product produced by an enzyme other than oxidoreductase can be detected by oxidoreductase.

A material having sufficient electrochemical stability in an aqueous solution under conditions where the electrode is used can be preferably used as a metal for an enzyme/metal particle complex. A plurality of different metals may be used in combination in an electrode in order to obtain intended properties. Examples thereof include Au, Pt, Ag, Co, Pd, Rh, Ni, Cr, Fe, Mo, Ti, Cu, W and alloys containing two or more of these.

A compound that does not react rapidly in an aqueous solution and can produce metal particles at a moderate rate can be preferably used as a metal precursor for preparing the enzyme/metal particle complex. Examples thereof include chloride salt, citrate salt, phosphate salt, borate salt, formate salt, acetate salt or sulfite salt of metal. Metal particles can be prepared from intermediates that are prepared from the metal salts described above.

Metal particles for the enzyme/metal particle complex are most preferably used in the form of dispersion of primary particles, but they may be aggregated particles which are agglomerates of primary particles. The primary particles of the metal particles have a particle size of preferably 2 nm to 50 nm, more preferably 2 nm to 20 nm. When metal particles form aggregated particles, the aggregated particles have a particle size of less than 200 nm, more preferably less than 50 nm. The lower limit of the aggregated particle size is preferably a particle size of 2 nm or more. The metal particles may also be referred to as metal fine particles.

The conductive member transports charge generated in an enzyme reaction to an external circuit. A material having high conductivity and sufficient electrochemical stability under conditions where the electrode is used can be preferably used as a material forming the conductive member. Examples of such a material forming the conductive member include metals, conductive polymers, metal oxides and carbon materials. Examples of metals include those containing Au, Pt, Ag, Ni, Cr, Fe, Mo, Ti, Al, Cu, V, In, Ga or W, which may be an alloy or may be plated. Examples of conductive polymers include those containing at least one compound selected from the group consisting of polyacetylene, polyarylene, polyarylenevinylene, polyacene, polyarylacetylene, polydiacetylene, polynaphthalene, polypyrrole, polyaniline, polythiophene, polythienylenevinylene, polyazulene and polyisothianaphthene. Examples of metal oxides include those containing at least one element selected from the group consisting of In, Sn, Zn, Ti, Al, Si, Zr, Nb, Mg, Ba, Mo, W, V and Sr. Examples of carbon materials include graphite, carbon black, carbon nanotubes, carbon nanohorns, fullerene compounds and derivatives thereof.

The mediator facilitates transfer of electrons between the enzyme/metal particle complex and the conductive member, and may be used according to need. Examples of mediators include metal complexes, quinones, heterocyclic compounds, nicotinamide derivatives, flavin derivatives and conductive polymers. Examples of metal complexes include those using a transition metal as a metal center. Examples of such metal include Os, Fe, Ru, Co, Cu, Ni, V, Mo, Cr, Mn, Pt, Rh, Pd and Ir. Examples of ligands of such a metal complex include those containing a nitrogen, oxygen, phosphorus, sulfur or carbon atom and forming a complex with a central metal via at least these atoms, or substances containing a cyclopentadienyl ring as the skeleton. Examples of such ligands include pyrrole, pyrazole, imidazole, 1,2,3- or 1,2,4-triazole, tetrazole, 2,2'-biimidazole, pyridine, 2,2'-bithiophene, 2,2'-bipyridine, 2,2':6',2"-terpyridine, ethylene diamine, porphyrin, phthalocyanine, acetylacetone, quinolinol, ammonia, cyan ions, triphenyl phosphine oxide and derivatives thereof. Examples of quinones include quinone, benzoquinone, anthraquinone, naphthoquinone, pyrroloquinoline quinone, tetracyanoquinodimethane and derivative thereof. Examples of heterocyclic compounds include phenazine, phenothiazine, viologen and derivatives thereof. Examples of nicotinamide derivatives include nicotinamide adenine dinucleotide (NAD) and nicotinamide adenine dinucleotide phosphate. Examples of flavin derivatives include flavin adenine dinucleotide (FAD). Examples of conductive polymers include polyacetylene, polyarylene, polyarylenevinylene, polyacene, polyarylacetylene, polydiacetylene, polynaphthalene, polypyrrole, polyaniline, polythiophene, polythienylenevinylene, polyazulene and polyisothianaphthene.

The carrier immobilizes at least one of the enzyme/metal particle complex and the mediator on the conductive member, and may be used according to need. Examples thereof include (1) polymer compounds, (2) inorganic compounds and (3) organic compounds containing a plurality of linking groups in the molecule.

The polymer compound may be used as a carrier on which an enzyme is electrostatically immobilized. In that case, preferably the polymer compound has a charge opposite from the surface charge of the enzyme/metal particle complex under conditions where the electrode is used. Examples of such polymers include conductive polymers such as polyacetylene, polyarylene, polyarylenevinylene, polyacene, polyarylacetylene, polydiacetylene, polynaphthalene, polypyrrole, polyaniline, polythiophene, polythienylenevinylene, polyazulene and polyisothianaphthene, and other polymers such as polystyrene sulfonic acid, polyvinylsulfuric acid, dextran sulfuric acid, chondroitin sulfuric acid, polyacrylic acid, polymethacrylic acid, polymaleic acid, polyfumaric acid, polyethyleneimine, polyallylamine hydrochloride, polydiallyldimethylammonium chloride, polyvinylpyridine, polyvinylimidazole, polylysine, deoxyribonucleic acid, ribonucleic acid, pectin, silicone resin, cellulose, agarose, dextran, chitin, polystyrene, polyvinyl alcohol and nylon.

Examples of inorganic compounds for a carrier include metal chalcogenide compounds containing at least one element selected from the group consisting of In, Sn, Zn, Ti, Al, Si, Zr, Nb, Mg, Ba, Mo, W, V and Sr. Examples of organic compounds containing a plurality of linking groups in the molecule include compounds containing at least one functional group selected from the group consisting of a hydroxyl group, a carboxyl group, an amino group, an aldehyde group, a hydrazino group, a thiocyanate group, an epoxy group, a vinyl group, a halogen group, an acid ester group, a phosphate group, a thiol group, a disulfide group, a dithiocarbamate group, a dithiophosphate group, a dithiophosphonate group, a thioether group, a thiosulfate group and a thiourea group. Typical examples of such organic compounds include glutaraldehyde, polyethylene glycol diglycidyl ether, cyanuric chloride, N-hydroxysuccinimide ester, dimethyl-3,3'-dithiopropionimidate hydrochloride, 3,3'-dithio-bis(sulfosuccinimidylpropionate), cystamine, alkyl dithiol, biphenylene dithiol and benzenedithiol.

The enzyme electrode of the present invention may have a structure in which the enzyme/metal particle complex is immobilized in a pore of a porous material. Pores of the porous body are connected one-dimensionally, two-dimensionally or three-dimensionally, and two or more of connected structures may be present at the same time. Examples of pores one-dimensionally connected include columnar pores, examples of pores two-dimensionally connected include reticulated pores, and examples of three-dimensionally connected pores include sponge-like pores, pores formed after joining fine particles and pores of a structural material prepared using those as a template. A material having conductivity, sufficient rigidity during storage and measurement and sufficient electrochemical stability under conditions where the electrode is used can be used as a material for the porous body. The porous body may have improved conductivity due to another conductive material, or may have conductivity imparted by the other conductive material. Examples of porous materials include metal oxides containing at least one element selected from the group consisting of In, Sn, Zn, Ti, Al, Si, Zr, Nb, Mg, Ba, Mo, W, V and Sr. Examples of conductive materials include metal, conductive polymers and carbon materials. Typical examples thereof include tin oxide mesoporous materials or anodized alumina with conducting layer. A porous material having a pore size of about 2 to 50 nm, which is large enough for an enzyme to be introduced, is preferably used.

Further, according to the method of forming metal particles from a metal precursor used in the present invention, metal particles can be formed in microspaces at high density under mild conditions through fewer steps. Generally, for introducing metal particles into microspaces, a method comprising introducing a solution of a metal precursor such as metal chloride salt into microspaces and then forming metal in the microspaces by treating the precursor with a reducing agent or reducing by heating is employed. In this method, when the step of introducing a metal precursor into microspaces and the reduction step are performed simultaneously, metal particles form in the solution both inside and outside the pore of the porous material, and so the step of introducing the metal precursor and the reduction step must be performed separately. Accordingly, since the amount of metal that can be introduced into microspaces in a cycle in the step of introducing a metal precursor solution is limited, the cycle must be repeated in order to immobilize metal particles at high density. In the present invention, a substance that does not easily react with a metal precursor is selected as the substrate, and an enzyme for the substrate is introduced into or immobilized in the pore of a porous body, and then the substrate and the metal precursor are introduced into the pore. This makes it possible to selectively form metal particles only at sites where the enzyme is present. In other words, introduction of a metal precursor and the step of precipitating metal for forming metal particles can be performed simultaneously. Further, by changing the reaction time in this step, the size of metal particles can be controlled and particles having a large particle size can be prepared in a cycle.

A sensor, which is a preferred embodiment of the present invention, comprises the enzyme electrode as a detection unit for detecting substances. In a typical configuration, the enzyme electrode, which is a working electrode, is combined with a counter electrode and a reference electrode is used according to need. In such a configuration, current generated by the substrate recognition ability of an enzyme immobilized on the electrode and the catalytic activity of the enzyme is detected, and the current is utilized for qualitative detection and measurement of the concentration of a substance in liquid in contact with the electrodes. The configuration of such sensors is not particularly limited as long as detection can be performed by the enzyme electrode. Due to high substrate selectivity of an enzyme and high current density brought by the use of the enzyme/metal particle complex, this sensor enables a broader range of detectable concentrations, simplification of the detection apparatus and downsizing of the detection unit.

A biofuel cell, which is a preferred embodiment of the present invention, comprises the enzyme electrode at least as an anode or a cathode. A typical configuration comprises a reaction vessel capable of storing an electrolyte containing a substance which is a fuel and an anode and a cathode disposed in the reaction vessel so as to be electrically isolated, wherein the enzyme electrode of the present invention is used as at least one of the anode and the cathode. The biofuel cell may be of a type in which the electrolyte is replenished or circulated, or without replenishment or circulation of the electrolyte. Types of fuels and structures and function of the biofuel cell are not limited as long as the enzyme electrode can be used in the biofuel cell. This biofuel cell can produce high operating voltage because substances can be oxidized/reduced at low overpotential by high catalytic activity inherent in the enzyme used as a catalyst in the electrode reaction, and also can produce high current density by the use of the enzyme/metal particle complex. As a result, high power density can be obtained.

EXAMPLE

The present invention is described in more detail with reference to Examples below, but the method of the present invention is not limited to these Examples. The temperature in the experiment in the following Examples is room temperature (25° C.) unless otherwise specified. Before describing Examples, Preparation Examples of complex polymers used in Examples are described.

Preparation Example 1

A method of synthesizing a complex polymer represented by the following formula (1) is described.

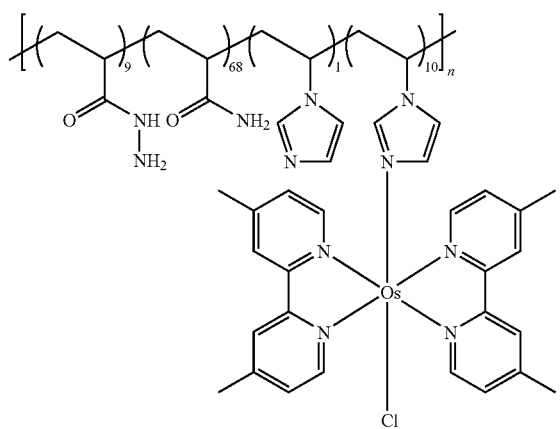

(1)

20 mL of ethylene glycol, 0.08 g of $(NH_4)_2[OsCl_6]$, and 0.38 g of 4,4'-dimethyl-2,2'-bipyridine were added to a 100 mL round bottom flask with a condenser. The mixture was stirred and irradiated with microwave of 300 W for 20 minutes with a microwave synthesizer (Microsynth made by Milestone) under nitrogen atmosphere. After cooling the solution to room temperature, 25 mL of water in which 0.4 g of $Na_2S_2O_4$ was dissolved was added thereto. Deep purple precipitate produced after stirring at room temperature for 1 hour was filtrated and washed with water to remove excess salt, washed with diethyl ether to remove unreacted ligands and heated to 60° C. under reduced pressure to give dry $Os(4,4'\text{-dimethyl-2,2'-bipyridine})_2Cl_2$.

15 mL of water, 2.63 g of acrylamide, 0.403 mL of 1-vinylimidazole and 0.069 mL of N,N,N',N'-tetramethylethylenediamine were added to a 100 mL three-neck flask with a thermometer and a condenser. Thereto was further added 0.06 g of ammonium persulfate under nitrogen atmosphere. The mixture was heated in a water bath at 40° C. for 30 minutes and the solution was air-cooled. The resulting viscous liquid was added dropwise to 500 mL of methanol that was vigorously stirred to precipitate a product, and the precipitate was collected by centrifugation. The precipitate was dissolved by adding a minimum amount of water, and the aqueous solution was added to 500 mL of methanol which was vigorously stirred. The precipitate was collected by centrifugation again and dried by heating to 60° C. under reduced pressure to give a 7.49/1 polyacrylamide-polyvinylimidazole copolymer. Generation of molecules and the unit ratio were determined by $^1$HNMR measurement ($D_2O$).

25 mL of ethylene glycol, 17.5 mL of ethanol, and 0.19 g of $Os(4,4'\text{-dimethyl-2,2'-bipyridine})_2Cl_2$ and 0.22 g of the polyacrylamide-polyvinylimidazole copolymer were added to 100 mL round bottom flask with a condenser. The mixture was stirred and irradiated with microwave of 400 W for 2 hours with a microwave synthesizer under nitrogen atmosphere. After cooling the resulting solution to room temperature, 20 mL of ethanol was added thereto. The solution was added dropwise to 500 mL of vigorously stirred diethyl ether. 20 mL of ethanol was added to a viscous precipitate. The mixture was again added dropwise to 500 mL of vigorously stirred diethyl ether. The resulting viscous precipitate was dried by heating to 60° C. under reduced pressure to give an intended complex polymer shown in the formula (1).

Preparation Example 2

A method of synthesizing a complex polymer represented by the following formula (2) is described.

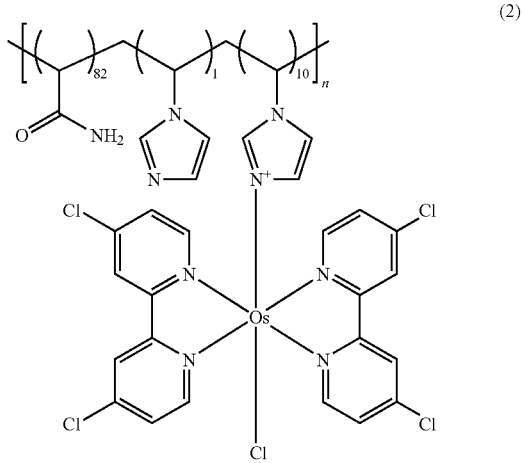

(2)

3 g of 2,2'-bipyridyl-N,N'-dioxide, and 6 mL of concentrated sulfuric acid and 3 mL of fuming sulfuric acid were added to a 100 mL round bottom flask with a condenser on an ice bath. The mixture was stirred to dissolve 2,2'-bipyridyl-N,N'-dioxide. Thereto was further added 6 mL of fuming nitric acid (1.52) and the mixture was heated to 100° C. and kept for 4 hours. The reaction solution was air-cooled and poured into crushed ice, and the resulting yellow powder was collected by filtration. The powder was washed with water and dried by heating to 60° C. under reduced pressure to give 4,4'-dinitro-2,2'-bipyridyl-N,N'-dioxide.

4.3 mL of glacial acetic acid, 2.9 mL of acetyl chloride and 0.27 g of 4,4'-dinitro-2,2'-bipyridyl-N,N'-dioxide was added to a 100 mL round bottom flask with a condenser, and the mixture was heated at 70° C. for 4 hours in a hot water bath. The reaction solution was air-cooled and poured into crushed ice, neutralized with 30% NaOH, and the resulting white precipitate was collected by filtration. The powder was washed with water and dried by heating to 60° C. under reduced pressure to give 4,4'-dichloro-2,2'-bipyridyl-N,N'-dioxide.

2 mL of chloroform, 0.326 mL of phosphorus trichloride and 0.082 g of 4,4'-dichloro-2,2'-bipyridyl-N,N'-dioxide were added to a 100 mL round bottom flask equipped with a condenser, and the mixture was refluxed in a hot water bath for 75 hours. The reaction solution was cooled with ice, poured into crushed ice and neutralized with 25% NaOH to pH 7 or higher. Chloroform was removed from the solution by distilling off under reduced pressure. The precipitated white powder was collected by filtration and washed with water. The powder was dissolved in a small amount of petroleum ether and recrystallized in a refrigerator overnight to give white needle crystal. The crystal was dried by heating to 60° C. under reduced pressure to give 4,4'-dichloro-2,2'-bipyridine.

20 mL of ethylene glycol, 0.08 g of $(NH_4)_2[OsCl_6]$ and 0.082 g of 4,4'-dichloro-2,2'-bipyridine were added to a 100 mL round bottom flask with a condenser. The mixture was stirred with a stirrer and irradiated with microwave of 300 W for 20 minutes with a microwave synthesizer under a nitrogen atmosphere. After cooling the solution to room temperature, 10 mL of water in which 0.1 g of $Na_2S_2O_4$ was dissolved was added thereto. Deep purple precipitate produced after stirring at room temperature for 1 hour was filtrated and washed with water to remove excess salt, washed with diethyl ether to remove unreacted ligands and dried by heating to 60° C. under reduced pressure to give dry Os(4,4'-dichloro-2,2'-bipyridine)$_2$Cl$_2$.

13 mL of ethylene glycol, 9 mL of ethanol, 0.02 g of Os(4,4'-dichloro-2,2'-bipyridine)$_2$Cl$_2$ previously prepared and 0.019 g of the polyacrylamide-polyvinylimidazole copolymer prepared in Preparation Example 1 were added to a 100 mL round bottom flask with a condenser. The mixture was stirred with a stirrer and irradiated with a microwave of 300 W for 2 hours with a microwave synthesizer under a nitrogen atmosphere. After cooling the solution to room temperature, 20 mL of ethanol was added thereto. The solution was added dropwise to 500 mL of a diethyl ether solution that was vigorously stirred. To a viscous precipitate thus produced, 20 mL of ethanol was further added. The resultant was again added dropwise to 500 mL of a diethyl ether solution that was vigorously stirred. The resulting viscous precipitate was dried by heating to 60° C. under reduced pressure to give an intended complex polymer shown in the formula (2).

Before describing Examples, a method of preparing a porous material used in Examples is described.

Preparation Example 3

Figure 2:
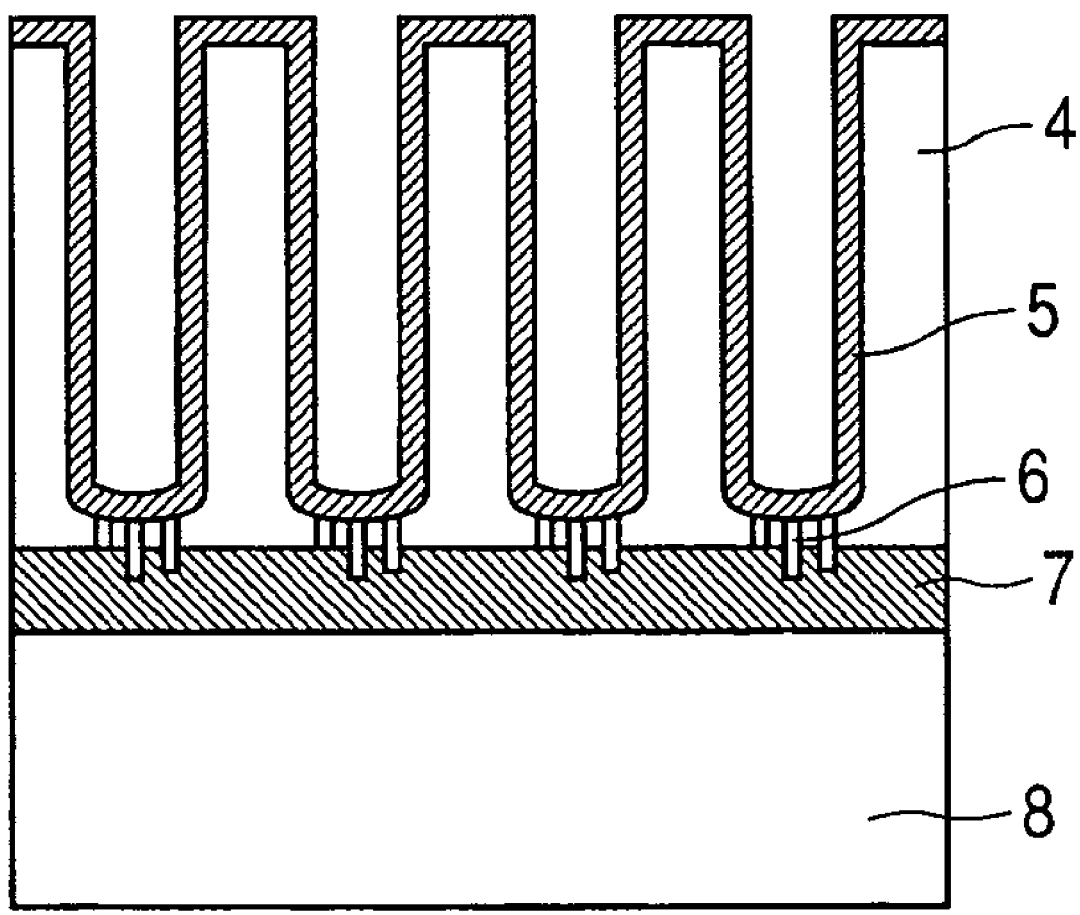
FIG. 2 illustrates the structure of carbon-coated alumina nanoholes.

A method of preparing carbon-coated alumina nanoholes is described. An Nb film 7 having a thickness of 100 nm is formed on an n-type phosphorus doped single crystal Si substrate 8 having a resistance of $1\times10^{-2}$ Ωcm polished to have a mirror surface by an RF sputtering method. Subsequently, an Al film of 500 nm is formed. An electrode is formed from the entire backside of the Si substrate, and anodization is performed in a 0.3M sulfuric acid aqueous solution at 3° C. by applying a DC voltage of 25V. In this step, anodization is performed with monitoring anodization current so as to detect a current that indicates that anodization starting from the Al surface reaches the Nb film. With the progress of the reaction, holes grow as Al is oxidized and turns to alumina, which is an insulating layer, and finally, the Nb base is conducted to the upper part through a conductive path 6. After the anodization, washing is performed with pure water and isopropyl alcohol to prepare an alumina nanohole. A scanning electron micrograph shows that the diameter of the hole obtained is about 20 nm. The alumina nanohole prepared is placed in a tube furnace and the temperature is increased to the preset temperature by 5° C. per minute. During the heat treatment, 2% $H_2$/98% He (volume ratio) is constantly supplied at 33 sccm and 1% $C_2H_2$/99% He (volume ratio) is constantly supplied at 66 sccm as hydrocarbon gas. Upon thermal decomposition of hydrocarbon 5, the gas flows at a total rate of 100 sccm at a mixed ratio of $C_2H_4:H_2:He=1:1:1\times10^{-2}$. The alumina nanohole is heated to 1000° C. in 3 hours and 20 minutes in 2% H2/98% He (volume ratio) atmosphere and maintained at 1000° C. for 10 minutes. Then, 1% $C_2H_2$/99% He (volume ratio) is supplied for 10 minutes. Subsequently, the alumina nanohole is maintained at 1000° C. for 1 hour and cooled in 3 hours and 20 minutes. As a result, a carbon-coated alumina nanohole 4 as shown in FIG. 2 is prepared.

Example 1

An enzyme electrode using a glucose oxidase/gold particle complex, a glucose sensor and a biofuel cell using the same are described.

First, preparation of an anode is described. The following components were put in a 10 mL sample bottle: 2 mL of 0.1 M phosphate buffer solution (pH 6.5), 50 mM of glucose, 10 mg mL$^{-1}$ glucose oxidase (hereinafter GOD) *Aspergillus niger* (190 U mg$^{-1}$, available from Sigma-Aldrich), 0 of NaAuCl$_4$, i.e. not added, and 4.8 or 8.0 mg mL$^{-1}$ of NaAuC$_{14}$. The mixture was left for 3 days to prepare a GOD/gold particle complex. A glassy carbon electrode (available from BAS) having a diameter of 3 mm was polished with alumina paste, and after ultrasonic cleaning with water, 6 μL of 10 mg mL$^{-1}$ aqueous solution of the complex polymer of Preparation Example 1 was dropped thereon. After drying, 1.2 μL of the GOD/gold particle complex previously prepared and 1.6 μL of 2.5 mg mL$^{-1}$ polyethylene glycol diglycidyl ether (hereinafter PEGDGE) were dropped thereon and the electrode was dried overnight. Subsequently, the electrode prepared was washed with a 20 mM phosphate buffer solution (hereinafter PBS) of pH 7.0 to which 0.15 M NaCl was added. The prepared samples are each referred to as anode A, anode B and anode C depending on the NaAuCl$_4$ concentration (none, 4.8 or 8.0 mg mL$^{-1}$).

Next, preparation of a cathode is described. 10.3 μL of 10 mg mL$^{-1}$ aqueous solution of the complex polymer described in Preparation Example 2, 2 μL of a 20 mM phosphate buffer solution (pH 7.0), 1.7 μL of a 20 mM phosphate buffer solution (pH 7.0) of 55 mg mL$^{-1}$ bilirubin oxidase (hereinafter BOD) *Myrothecium verrucaria* (15-65 Umg$^{-1}$, available from Sigma-Aldrich), and 2 μL of a 7 mg mL$^{-1}$ PEGDGE aqueous solution were put in a microtube and the mixture was mixed. 6 μL of the solution was dropped on a glassy carbon electrode having a diameter of 3 mm, which was polished with alumina paste and ultrasonically cleaned with water, and the electrode was dried overnight. Subsequently, the prepared electrode was washed with PBS.

Figure 3A:
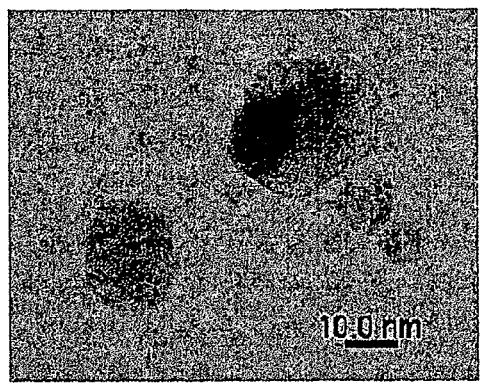
FIGS. 3A and 3B are transmission electron micrographs of gold particles prepared in Example 1.
Figure 3B:
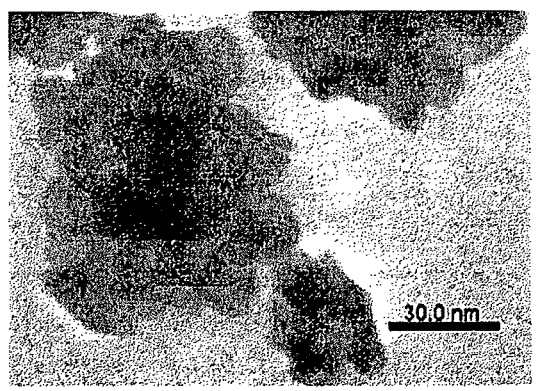
Figure 3C:
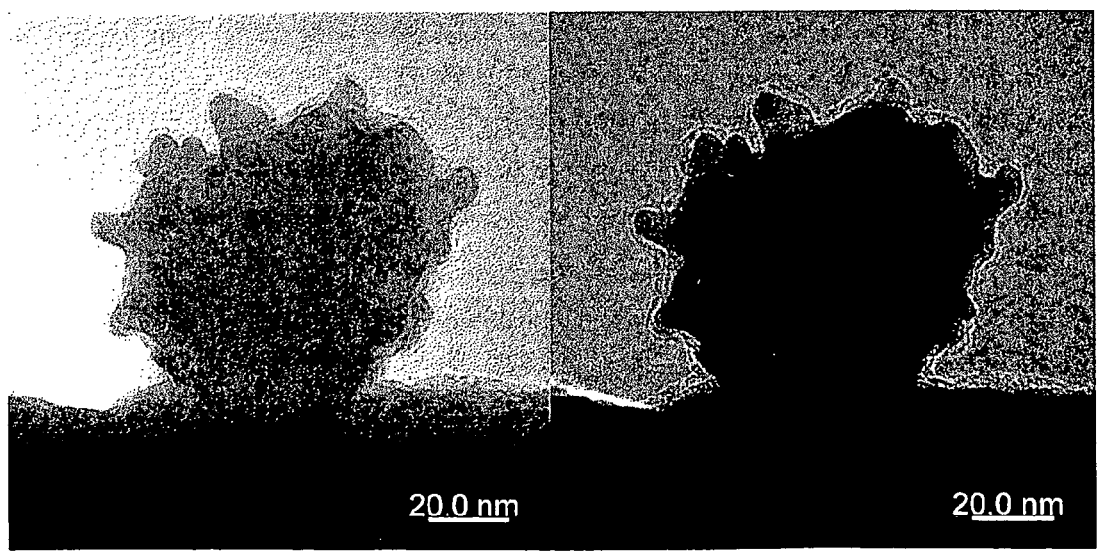
FIG. 3C is a transmission electron micrograph of a metal particle contained in the enzyme.

Transmission electron micrographs of the GOD/gold particle complexes prepared are shown in FIGS. 3A and 3B. The gold particles produced were in the form of primary particles or aggregated particles in which primary particles are associated depending on the concentration of NaAuCl$_4$ added. Under conditions of this Example, the gold particles were in the form of primary particles (FIG. 3A) when the NaAuCl$_4$ concentration was 8.0 mg mL$^{-1}$ and aggregated particles (FIG. 3B) when the NaAuCl$_4$ concentration was 4.8 mgmL$^{-1}$. The gold particles had an average particle size of 18 nm (primary particle size) and 45 nm (aggregated particle size). A metal particle contained in the enzyme was confirmed by a transmission electron micrograph (FIG. 3C).

Figure 4:
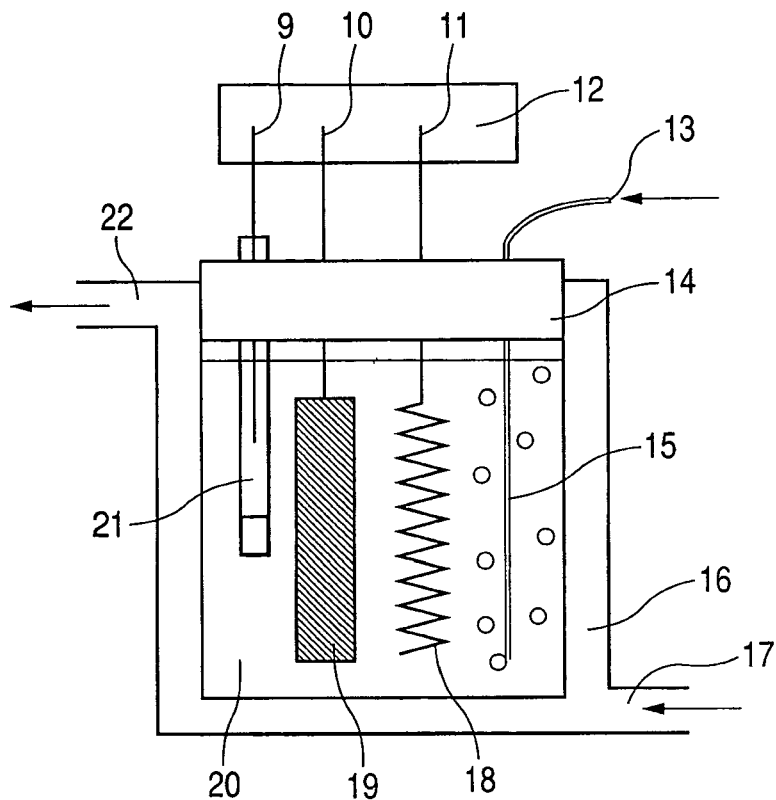
FIG. 4 is a schematic view of a three-electrode cell.
Figure 5:
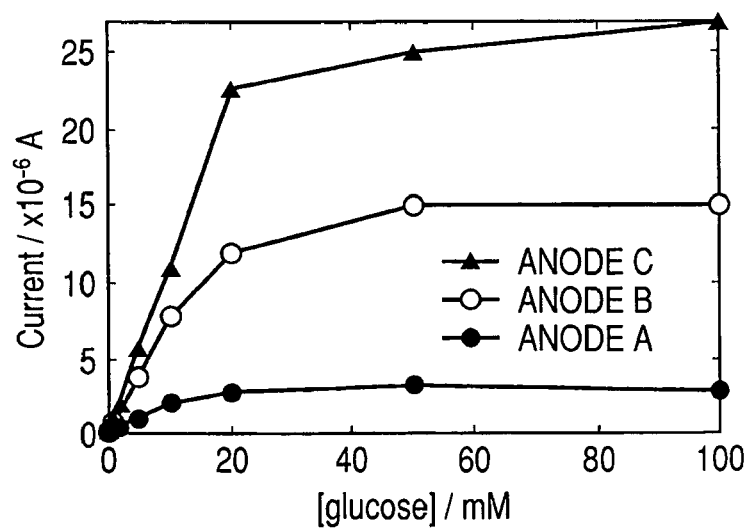
FIG. 5 is a graph showing the relationship between the steady state current and the substrate concentration in the substrate sensor of Example 1.

A substrate sensor using the enzyme electrode prepared is now described in detail. As shown in FIG. 4, a three-electrode cell was formed using the prepared anode as a working electrode 19, a platinum wire as a counter electrode 18, and a silver/silver chloride electrode as a reference electrode 21. The cell was connected, via a lead 9 of the reference electrode, a lead 10 of the working electrode, and a lead 11 of the counter electrode, to a potentiostat 12 to form a substrate sensor. PBS was used as an electrolyte 20 and oxygen was removed from the electrolyte by introducing N2 gas for 30 minutes or more, via a gas-feeding passage 13 and a gas-feeding canal 15. A potential of 300 mV vs Ag/AgCl is applied to the working electrode 19 and steady state current (catalytic current) is observed. Also show in FIG. 4 are a temperature control cell 16, a temperature control water inlet 17, and a temperature control water outlet 22. FIG. 5 shows the dependency of the steady state current on the glucose concentration in a solution observed using each of the anodes A, B and C as the working electrode 19. The steady state current value observed in the respective anodes at a glucose concentration of 5 mM is each 1.1 µA, 3.9 µA and 5.8 µA for the anodes A, B and C. This shows that use of the GOD/gold particle complex increases the current by five times or more. In each anode, the steady state current linearly increases to a certain glucose concentration. The linear increase ranges from 100 µM to 10 mM in the anode A, from 20 µM to 10 mM in the anode B and from 10 µM to 20 µM in the anode C. These results indicate that high current from enzyme catalysis is observed due to the formation of the GOD/gold particle complex and with this, the glucose concentration range measurable by a glucose sensor is extended.

Figure 6:
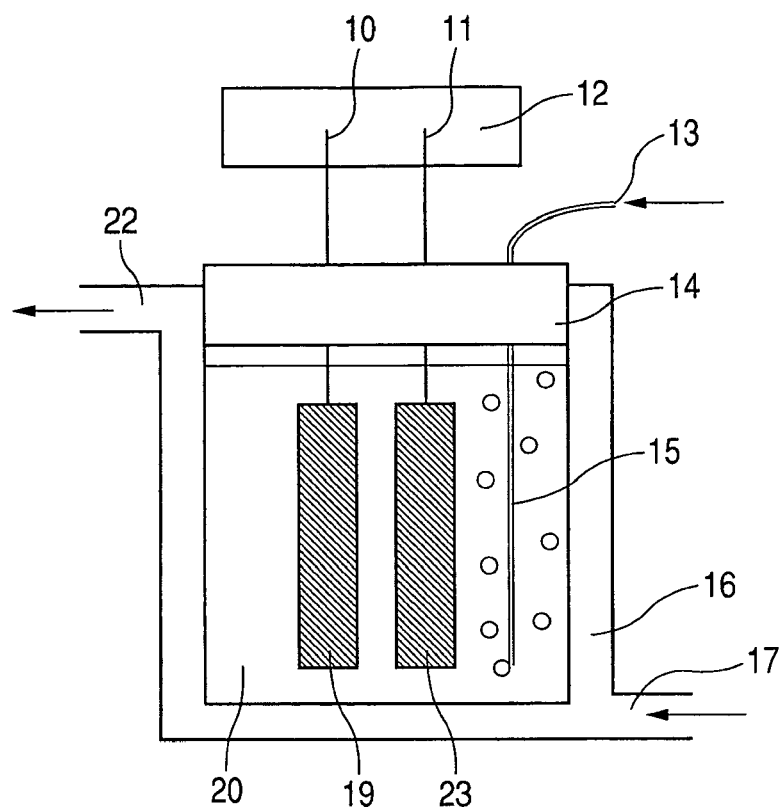
FIG. 6 is a schematic view of a two-electrode cell.

A biofuel cell using the anode A, B or C prepared and a cathode is now described in detail. As shown in FIG. 6, a biofuel cell is formed using the prepared anode as a working electrode 19 and the prepared cathode as a counter electrode 23. PBS containing 10 mM of glucose is used as an electrolyte 20, and with bubbling air, biofuel cell characteristics are measured using each of the anodes A, B and C as the working electrode 19. As a result, the maximum output measured of each of the anodes A, B and C is 0.29 µW, 1.2 µW and 1.9 µW. The voltage which produces the maximum output is each 0.17 V, 0.19 V and 0.21 V. These results indicate that high current from enzyme catalysis flows due to the formation of the GOD/gold particle complex, and this increases the output of biofuel cells.

Example 2

The carbon-coated alumina nanohole substrate of Preparation Example 3 is cut into a 1 cm square piece. After hydrophilizing by UV-ozone treatment, the piece is immersed in a PBS solution of 1 mgmL$^{-1}$ GOD for 24 hours in a sample bottle. The substrate is pulled out of the solution and washed with 0.1 M phosphate buffer solution (pH 6.5) 10 times. The substrate is further immersed in a 0.1 M phosphate buffer solution (pH 6.5) of 0 (no NaAuCl$_4$) or 8 mgmL$_{-1}$ NaAuCl$_4$, and 50 mM of glucose is added thereto and the mixture is allowed to stand for 3 days. The substrate is pulled out of the solution and washed with PBS 10 times, and electrical contact is established between a copper wire which is a lead using carbon paste (available from Asahi Chemical Research Laboratory Co., Ltd.). Of the conductive parts including the carbon paste and the copper wire, parts which come into contact with the solution are coated with silicone rubber (available from Shin-Etsu Silicones) for insulation. The prepared samples are each referred to as anode D and anode E depending on the NaAuCl$_4$ concentration (none or 8.0 mg mL$^{-1}$).

Figure 7:
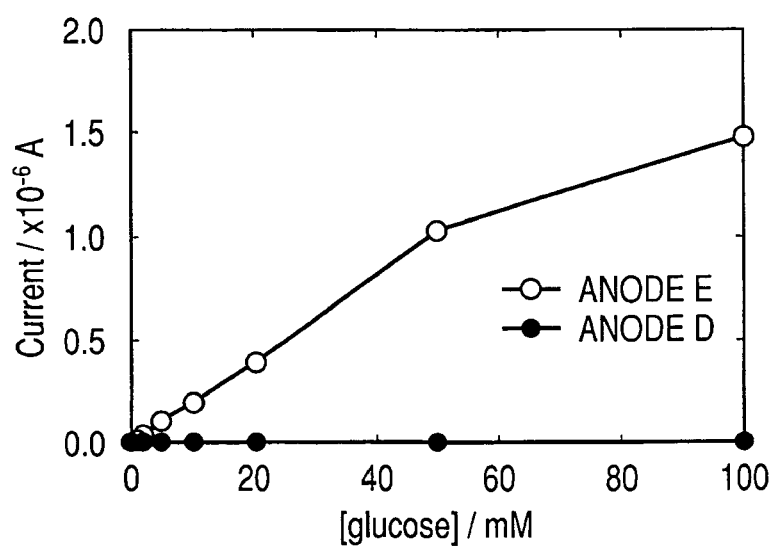
FIG. 7 is a graph showing the relationship between the steady state current and the substrate concentration in the substrate sensor of Example 2.

A substrate sensor using the enzyme electrode prepared is now described in detail. As shown in FIG. 4, a substrate sensor is formed using the prepared anode as a working electrode 19, a platinum wire as a counter electrode 18, and a silver/silver chloride electrode as a reference electrode 21, which are connected to a potentiostat 12. PBS is used as an electrolyte 20 and oxygen is removed from the electrolyte by introducing N$_2$ gas for 30 minutes or more. A potential of 600 mV vs Ag/AgCl is applied to the working electrode 19 and steady state current (current from enzyme catalysis) is observed. FIG. 7 shows the dependency of the steady state current on the glucose concentration in a solution observed using each of the anodes D and E as the working electrode 19. As a result, while no current from enzyme catalysis was observed when the anode D was used, current from enzyme catalysis was observed when the anode E was used. In anode E, the current value linearly increases relative to glucose concentrations in a glucose concentration range of 1 mM to 50 mM. The result shows that carbon on the wall of a base material is not electrically connected to the redox center of the enzyme in the anode D in which the enzyme is only held in the alumina nanohole without generation of gold particles. This also shows that the current from enzyme catalysis generated by the oxidization of glucose cannot be drawn to the outside circuit. On the other hand, the current from enzyme catalysis generated by the oxidization of glucose which cannot be measured in anode D is measurable in anode E. This shows that due to the formation of the GOD/gold particle complex in the carbon-coated alumina nanohole in the anode E, the redox center of the enzyme and carbon on the wall of a base material are electrically connected and current from enzyme catalysis is detected. In short, glucose concentrations can be measured using the anode E. This also indicates that as an enzyme is introduced into a pore of a porous material, metal particles precipitate from a metal precursor in the presence of a substrate for the enzyme and the metal precursor by the reaction of the enzyme involving the substrate for the enzyme.

A biofuel cell using the anode D or E prepared and a cathode is now described in detail. As shown in FIG. 6, a biofuel cell is formed using the prepared anode as a working electrode 19 and the cathode described in Example 1 as a counter electrode 23. The cell is connected to a potentiostat 12, and using PBS containing 50 mM of glucose as an electrolyte 20 and with bubbling air, biofuel cell characteristics are measured. As a result, no electromotive force is observed in the biofuel cell using the anode D. On the other hand, an output of 0.04 µW is measured in the biofuel cell using the anode E. In this case, the voltage which produces the maximum output is 0.09 V. These results indicate that current from enzyme catalysis flows since the redox center of an enzyme and the wall of a base material are electrically connected due to the formation of the GOD/gold particle complex, and this makes it possible to collect the output of biofuel cells.

The present invention can provide a novel enzyme electrode and a sensor and a biofuel cell using the same. The enzyme electrode is very useful as a member for, for example, biosensors and fuel cells using a substrate for an enzyme as a fuel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-289102, filed Sep. 30, 2005, which is hereby incorporated by reference herein in its entirety.

What is claimed is:

1. An enzyme electrode comprising a conductive member, an enzyme and a metal particle, wherein the metal particle is contained in the enzyme.

2. The enzyme electrode according to claim 1, wherein the metal particle and the enzyme comprise a complex in which part of the metal particle is incorporated into the enzyme.

3. The enzyme electrode according to claim 2, further comprising a mediator that mediates charge transfer between the complex and the conductive member.

4. The enzyme electrode according to claim 3, further comprising a carrier that immobilizes at least one of the complex and the mediator on the conductive member.

5. The enzyme electrode according to claim 1, wherein the metal particles are formed by allowing the enzyme and a substance which is a substrate for the enzyme to react in the presence of a metal precursor capable of forming a metal by the reaction of the enzyme and the substrate.

6. The enzyme electrode according to claim 1, wherein the conductive member has a porous structure and the complex of the enzyme and the metal particle is formed in a pore of the porous structure.

7. The enzyme electrode according to claim 1, wherein the metal comprising the metal particles is gold.

8. The enzyme electrode according to claim 1, wherein an aggregated particle of the metal particles has a particle diameter of 200 nm or less.

9. A fuel cell comprising an area capable of holding an electrolyte between an anode electrode and a cathode electrode, wherein at least one of the anode electrode and the cathode electrode is an enzyme electrode according to claim 1.

10. A method of producing a metal particle in a pore of a porous material, which comprises:
   introducing an enzyme into a pore of the porous material, and
   precipitating a metal particle from a precursor of the metal particle by the reaction of the enzyme and a substrate for the enzyme in the presence of the substrate and the precursor.

11. A method of producing an enzyme electrode, which comprises the steps of:
   preparing an enzyme, and
   reacting the enzyme with a substrate for the enzyme in the presence of a metal precursor capable of forming a metal by the reaction of the enzyme and the substrate to prepare an enzyme/metal particle complex containing a metal particle in the enzyme.

12. A method of producing an enzyme electrode, which comprises the steps of:
   introducing an enzyme into a pore of a porous material, and
   allowing the enzyme in the pore of the porous material to react with a substrate for the enzyme in the presence of a metal precursor capable of forming a metal by the reaction of the enzyme and the substrate to prepare an enzyme/metal particle complex containing a metal particle in the enzyme.

* * * * *